United States Patent Office 3,134,413
Patented May 26, 1964

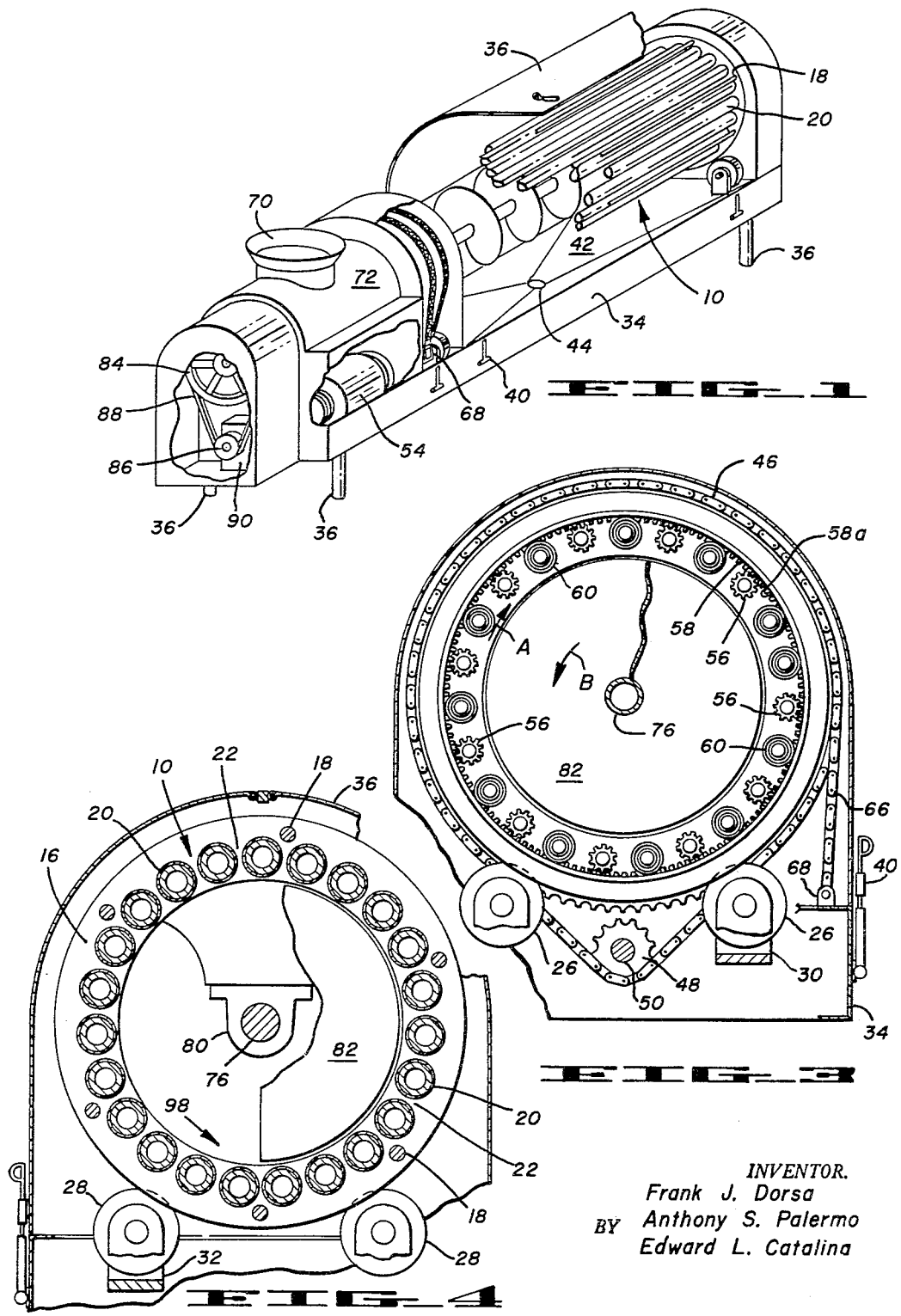

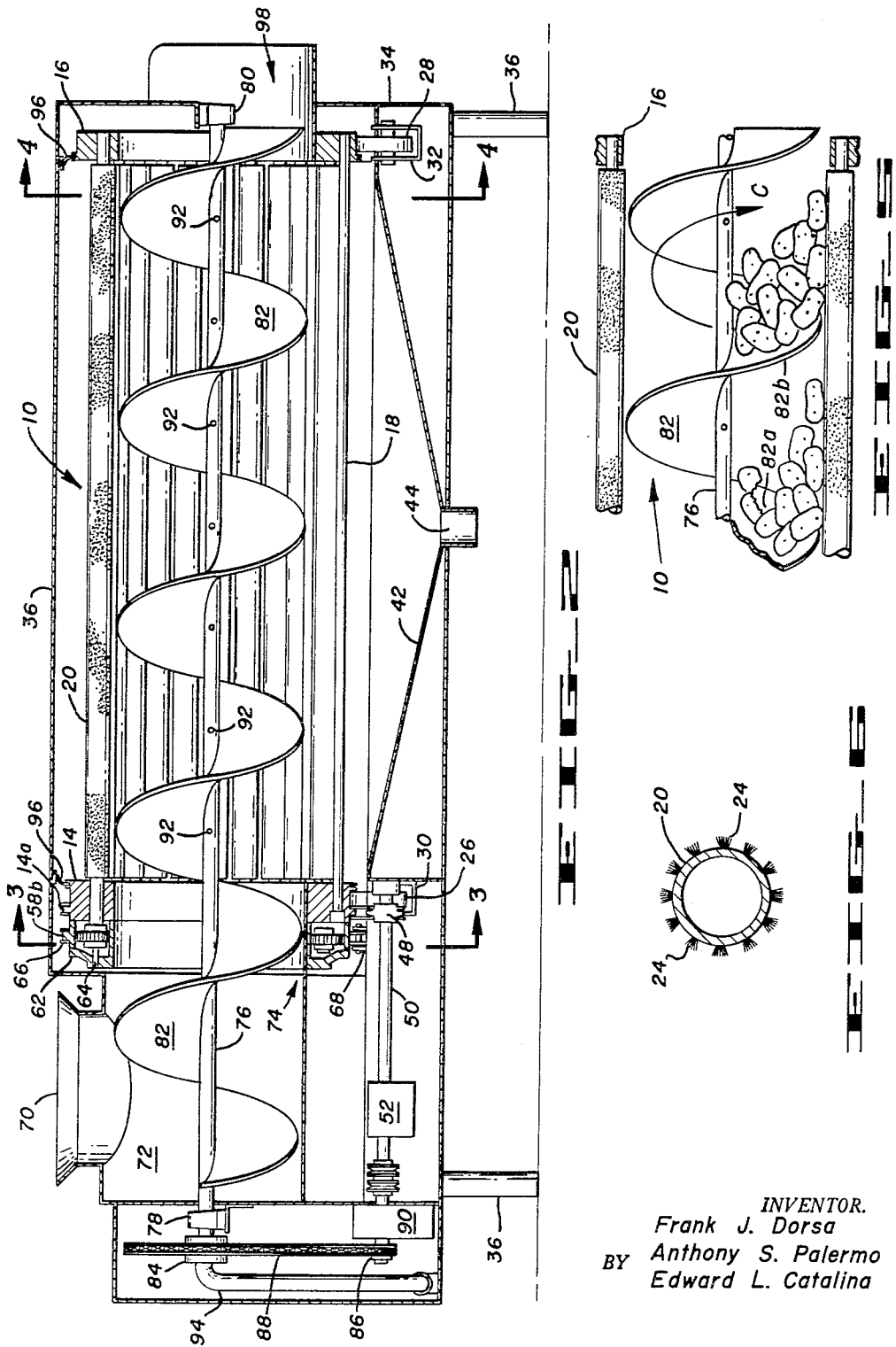

3,134,413
APPARATUS FOR PEELING FRUITS OR VEGETABLES
Frank J. Dorsa, Saratoga, and Anthony S. Palermo, San Jose, Calif., and Edward Leonard Catalina, Somerset, Mass., assignors to Eggo Food Products, Inc., San Jose, Calif., a corporation of California
Filed Jan. 18, 1962, Ser. No. 167,127
5 Claims. (Cl. 146—49)

The present invention relates to apparatus for peeling fruits or vegetables, and more particularly, to apparatus which removes the epidermis of the fruit or vegetable by an abrasive process.

The removal of the epidermis of various fruits and vegetables by abrasion is generally well known but it is obviously essential that the entire surface of the individual fruit or vegetable contact the abrasive surface for an appropriate period of time if complete and satisfactory peeling is to be accomplished. This necessary or essential condition can be satisfied relatively easily if the rate of production is limited; potatoes placed in a single layer on a moving abrasive surface can be removed when visual observation indicates the peeling is complete. However, known apparatus, presumably designed for high production, has failed to meet the essential condition in that the potatoes, for example, fed thereto en masse are abraded unequally, some of the potatoes emerging but partially peeled while others have been excessively abraded so as to involve a highly-undesirable waste.

Accordingly, it is a general object of the present invention to provide a peeling apparatus for fruits or vegetables, and particularly, potatoes, which is effective in its function even under very high production rates.

It is a feature of the present invention to provide a peeling apparatus which is continuous in its operation so that unpeeled fruit or vegetables delivered continuously to the entrance end of the apparatus pass steadily through the apparatus to emerge a short time later in the desired peeled state, thus avoiding interruptions experienced during a "batch-type" operation so as to expedite the peeling process.

Additionally, it is a feature of the invention to provide a continuous peeling apparatus wherein the fruits or vegetables can be delievered thereto in relatively large quantities that are subjected to a tumbling action during progress through the apparatus so that each individual fruit or vegetable is exposed to an abrasive surface or surfaces whereby complete as well as expeditious peeling is effected.

It is another feature of the invention to provide a peeling apparatus wherein the advance and tumbling of the fruit or vegetables through the apparatus are made adjustable so that although complete peeling of all the fruits or vegetables is achieved, yet excessive peeling and the resultant waste is avoidable.

A related feature of the invention is the arrangement of the peeling apparatus so that the mentioned adjustments can be made during the peeling operation in accordance with the visually observed results.

Yet another feature of the invention is the provision of a peeling apparatus that incorporates a particularly effective water spray arrangement for separating the abraded particles from the peeled fruits or vegetables.

Yet a further feature of the invention is the provision of an arrangement for conveying or advancing fruits or vegetables through the apparatus which simultaneously functions to provide a moving water spray for cleansing the peeled fruits and vegetables.

In accordance with one aspect of the invention, the mentioned arrangement for advancing the fruits or vegetables additionally functions as one abrasive element for effecting the peeling operation.

Another specific aspect of the invention is the provision of abrasive elements in the form of bristles or brushes which are of particular utility in the peeling of potatoes so that the "eye" portions are effectively abraded and thus peeled.

These as well as additional objects and features of the invention will become more apparent from a perusal of the following description of the structure illustrated in the accompanying drawings wherein:

FIG. 1 is an isometric view of a peeling apparatus embodying the present invention, portions of its exterior being broken away to illustrate certain interior structural details, FIG. 2 is an enlarged central, longitudinal sectional view through the apparatus, FIG. 3 is a transverse sectional view taken substantially along line 3—3 of FIG. 2, FIG. 4 is another transverse sectional view taken along line 4—4 of FIG. 2, FIG. 5 is a fragmentary diagrammatic side view illustrative of the action of the peeling appartaus on potatoes, and FIG. 6 is an enlarged transverse sectional view through one form of abrasive element.

Generally, the peeling apparatus embodying the present invention includes a rotary drum 10 having an abrasive interior surface that is preferably mounted for rotation about substantially a horizontal axis together with means for advancing the fruits or vegetables to be peeled from the entrance to the exit end of the drum or from the left to the right, as viewed in FIGS. 1 and 2 and 5.

More particularly, the rotary drum 10 includes a pair of rings 14, 16 that are joined and supported in spaced, parallel relation by a series of tie rods 18. The rings 14, 16 are provided with aligned bores which rotatably receive the respective ends of a plurality of shafts 20, each shaft having an abrasive material on its exterior surface. The shafts 20 are rather closely spaced circumferentially around the rings 14, 16, so that the interior abrasive surface of the drum 10 formed by the plurality of shafts is interrupted by small apertures or openings 22 best shown in FIG. 4 that will permit the abraded peel of the fruits or vegetables to pass therethrough but will preclude the passage of even the smallest fruit or vegetable being peeled. The character of the abrasive surface on the shafts will vary dependent on the particular fruit or vegetable which is to be handled by the apparatus, but in the case of potatoes, for example, such abrasive surface can be formed by the application of a granular outer coating to the shafts. If desired, certain portions of the shafts 20 may be provided with short bristles 24, as indicated in FIG. 6, to facilitate the cleansing of the "eye" portions of potatoes.

The entire drum 10, as described, is supported for rotation on pairs of rollers 26, 28 upon which the drum rings 14, 16 may rest. The rollers 26, 28 in turn are suitably rotatably supported in brackets 30, 32 on the generally rectangular frame 34 of the apparatus which includes short supporting legs 36 at its corners. From the side members of the frame 34 a cover 38 of generally inverted U-shape is removably secured, as shown at 40, to rise and appropriately enclose the entire rotary drum 10. Underneath the drum 10 a trough 42 is supported from the rectangular frame 34 to receive any abraded particles, such trough 42 being tapered to a central opening 44 through which the particles may be ultimately withdrawn to the sewer.

In order to effect the mentioned rotation of the entire drum 10, the ring 14 at the entrance end of the apparatus is provided on its perimeter with gear teeth 14a that are engaged by an endless sprocket chain 46 that passes around the ring and around a small sprocket 48 (see FIGS. 2 and 3) fixed thereunder on a shaft 50 suitably connected through a variable speed reduction unit 52 to a drive motor 54 located at the entrance end of the apparatus, as clearly illustrated in FIG. 1. The drive connections are such that energization of the motor 54 effects rotation of the drum 10 in a clockwise direction, when viewed from the entrance end of the apparatus, as indicated by the arrow A in FIG. 3, and preferably, the rate of rotation of the drum can be varied between 10 and 30 revolutions per minute.

Preferably, in addition to the rotative motion of the entire drum 10, means are provided to effect rotation of the individual shafts 20 to further enhance the abrasive peeling process. For this purpose, each shaft 20 projects through and slightly beyond the mounting ring 14 at the entrance end of the apparatus and carries a planetary gear 56 that is suitably fixed thereto and is arranged to mesh with an internal ring gear 58 that is supported for rotation relative to the rotary drum 10 by rollers 60 supported for free rotation on the projecting shafts 20 and engaging the interior of integral shoulders 58a formed adjacent the teeth of the internal ring gear 58. A cover ring 62 is secured to the mounting ring 14 by suitable bolts 64 and the two rings 14, 62 are arranged cooperatively to enclose the planetary gears 56 and rollers 60 so that suitable lubricants can be retained on these moving elements, and to retain the ring gear 58 in meshing engagement with the planetary gears 56.

As illustrated most clearly in FIG. 2, the ring gear 58 projects outwardly between the mounting and cover rings 14, 62 and its exterior and is also provided with gear teeth 58b that are in meshing engagement with a sprocket chain 66 that passes over the top of the ring gear 58 and is fixed at each of its downwardly projecting extremities to the frame 34 of the apparatus, as indicated at 68 in FIGS. 1, 2, and 3. Thus, the entire ring gear 58 is maintained against movement, and consequently, as the entire drum 10 is rotated in the mentioned clockwise direction, the planetary gears 56 will partake of an epicyclic motion around the interior of the internal ring gear 58 and individual counterclockwise motion of the shafts 20 will result. Preferably, the gear ratios are such that as the drum speed is varied from 10 to 30 r.p.m., a rotative speed of the shafts of from 150 to 450 r.p.m. will be achieved.

This correlated drive arrangement of the drum 10 and the individual shafts 20 is generally satisfactory for most peeling operations but it is to be expressly observed that since the internal ring gear 58 can be rotated relative to the drum 10 and is provided with external gear teeth 58b, the fixed sprocket chain 66 could be replaced by a conventional drive connection similar to that used for driving the drum 10 to effect rotation of the ring gear 58 at variable speeds either in the opposite direction from that of the drum 10 or in the same direction depending upon the requirements of the particular peeling process.

In order to introduce fruits or vegetables into the rotary drum 10, a vertically disposed hopper 70 is positioned on the top of a generally cylindrical feed housing 72 which is mounted on the frame 34 adjacent the entrance end of the rotary drum 10 and in alignment therewith. The fruits or vegetables dropped into such hopper 70 are moved from the cylindrical feed housing 12 through the rotary drum 10 by a helicoidal conveyor, generally indicated at 74, that includes a long shaft 76 rotatably supported on suitable bearings 78, 80 at the end of the feed housing 72 and at the exit end of the apparatus so that the drum 10 and shaft 76 are coaxial. The shaft 76 supports a rigid helicoid 82 that has a right hand thread and a peripheral dimension slightly less than the interior diameter of the cylindrical feed housing 72 and the rotary drum 10 itself. The shaft 76 projects beyond its bearing at the entrance end of the apparatus and carries a sprocket 84 connected to a smaller sprocket 86 thereunder by a suitable drive chain, 88, the smaller sprocket 86, in turn, being mounted on the output shaft of a variable speed reducer 90 suitably connected to the previously described drive motor 54. The drive connections are such that the helicoid 82 is rotated in a counterclockwise direction when viewed from the entrance end of the apparatus, as indicated by the arrow B in FIG. 3 and at a speed which may be varied between 4 and 15 revolutions per minute, such rotation serving to advance the fruit or vegetables through the feed housing 72 and the rotary drum 10 after the general fashion of a conventional screw conveyor. The surfaces of the helicoid 82 can be smooth or alternatively within the rotary drum 10, may be covered with an abrasive material such as applied to the shafts 20 so as to further cooperate with the shafts in order to enhance the rate of peeling.

In order to cleanse the fruits or vegetables during the peeling operation of the abraded peeled material, a spray of water is preferably introduced into the interior of the rotary drum, such water serving to carry the material downwardly through the apertures 22 between the abrasive shafts 20 and into the trough 42 thereunder. In accordance with an additional aspect of the present invention, such water spray is effectively introduced from the central axis of the rotary drum 10 and more particularly through the shaft 76 supporting the helicoid 82. As shown in FIG. 3, the shaft 76 is made hollow through its entire length except at the exit end of the apparatus and is formed with a plurality of small transverse holes 92 along its length within the interior of the rotary drum 10. Water through a suitable conduit 94 at the entrance end of the apparatus is supplied to the end of the hollow shaft 76 and passes therethrough to emerge from the described holes or apertures 92 as a fine spray which projects itself radially outwardly and also rotates as the shaft itself rotates. Very effective cleansing, particularly when a rather large load of fruits or vegetables is passing through the rotary drum 10 is achieved by the described arrangement. In order to keep the water from the rotary supports and drive for the drum 10, suitable seals, indicated at 96, are formed on the mounting rings 14, 16 adjacent the entrance and exit ends of the drum.

The described spray thoroughly cleanses fruits or vegetables and the peeled and cleansed product emerges from the exit end of the rotary drum 10 through a suitable opening 98 (see FIG. 4).

While the general operational characteristics of the described apparatus may be obvious from the foregoing structural description, a brief resume of its operation in the peeling of potatoes will indicate more clearly why effective peeling of large quantities of potatoes can be achieved. As shown in FIG. 5, potatoes may be introduced sufficiently rapidly into the apparatus to maintain a level of approximately half the height of the rotary drum 10. If the rotary drum 10 is viewed transversely looking in the direction of advance of the potatoes, it will be immediately obvious that the clockwise rotation of the drum 10 will impart a transverse clockwise tumbling action on the potatoes so that a continuous circulation in this direction is experienced to bring different individual potatoes of the entire mass into contact with either the abrasive shafts 20 or with the abrasive helicoid 82, if the latter is employed. Furthermore, it will be quite obvious that the counterclockwise rapid rotation of the individual shafts 20 will not only abrade the surface of an adjacent potato, but will also tend to effect a simultaneous rotation of that individual potato to thus bring the abrasive surfaces of the shafts into contact with various portions of the potato.

Not quite so obvious is the action of the helicoid 82 itself in enhancing the peeling process. In the first place, since the helicoid 82 rotates in a counterclockwise direction, it tends to impart a counterclockwise rotation of the mass of potatoes and particularly those located near the axis of the helicoid which are not experiencing the opposite rotative forces of the rotary drum 10 so that in cooperation with the rotary drum, an additional transverse tumbling of the potatoes is experienced to periodically bring those potatoes near the axis outwardly into contact with the abrasive drum 10 and those initially in contact with the drum into a more central position.

In the second place, as can best be visualized by specific reference to FIG. 5, as the helicoid 82 turns and that segment indicated at 82a in FIG. 5 moves upwardly, a tendency to lift the adjacent potatoes is experienced while at the same time a space is vacated adjacent the rear face of the next turn 82b of the helicoid so that, in turn, potatoes may drop into such vacated area, thus, ultimately, achieving a tumbling of the potatoes in a direction axially or longitudinally of the apparatus, as shown by the arrow C in FIG. 5. In summary, it can be seen that both a transverse and longitudinal tumbling of the potatoes is continuously experienced during progress of the potatoes through the apparatus, and as a result of such continuous tumbling, substantially equivalent exposure of the surface of each individual potato to the abrasive shafts 20 or helicoid 82 is experienced. Not only is the peeling process thus equalized, but through adjustment of the rotative speeds of the drum 10, the individual shafts 20, and the helicoid 82, the desired amount of peeling can be achieved so that waste is eliminated. Such adjustments are easily made during operation while observing the peeled product.

The effectiveness of the apparatus can be more clearly indicated when it is realized that a rotary drum 10 seven feet in length and two and one-half feet in diameter is capable of peeling potatoes at a rate of 10,000 pounds per hour.

Various modifications and/or alterations can obviously be made in the described structure without departing from the spirit of the invention. Consequently, the foregoing description of one embodiment of the invention is to be considered as purely exemplary and not in a limiting sense; and the actual scope of the invention is to be indicated by reference to the appended claims.

What is claimed is:

1. Apparatus for continuously peeling fruits or vegetables which comprises a substantially horizontal rotary drum having its wall formed by a plurality of circumferentially-spaced parallel shafts, each shaft being individually rotatable about its own axis and having an abrasive surface, means for rotating said drum in one direction, means for rotating said shafts in the opposite rotative direction, a rotatable helicoidal conveyor mounted concentrically within said drum and with its periphery adjacent the interior surface of said drum, and means for rotating said conveyor in a direction opposite to that of said drum.

2. Apparatus for continuously peeling fruits or vegetables according to claim 1 wherein said helicoidal conveyor includes a perforate hollow shaft and which comprises means for supplying water under pressure to the interior of said hollow shaft whereby a spray emanates from the shaft perforations.

3. Apparatus for continuously peeling fruits or vegetables according to claim 1 which comprises means for individually adjusting the speed of rotation of said drum, said shafts and said helicoidal conveyor.

4. Apparatus for continuously peeling fruits or vegetables according to claim 1 wherein at least a portion of the abrasive surface on said shafts is formed by bristles.

5. Apparatus for peeling fruits or vegetables which comprises a substantially horizontal drum having an interior abrasive surface formed by a plurality of parallel rotatable shafts, each of said shafts including a substantially cylindrical abrasive surface carried thereby, means mounting said drum for rotation about its own axis in one direction, means for rotating said shafts in the opposite rotative direction relative to that of said drum, and conveyor means mounted longitudinally within said drum in closely spaced relation to said cylindrical abrasive surfaces to urge said fruits or vegetables along said abrasive surfaces.

References Cited in the file of this patent

UNITED STATES PATENTS

| 1,400,352 | Forry | Dec. 13, 1921 |
| 1,995,693 | Urschel | Mar. 26, 1935 |
| 2,021,970 | Urschel | Nov. 26, 1935 |
| 2,424,803 | de Back | July 29, 1947 |

FOREIGN PATENTS

| 146,065 | Germany | Nov. 21, 1903 |
| 15,312 | Great Britain | 1908 |
| 128,802 | Great Britain | July 3, 1919 |